Figure 1:
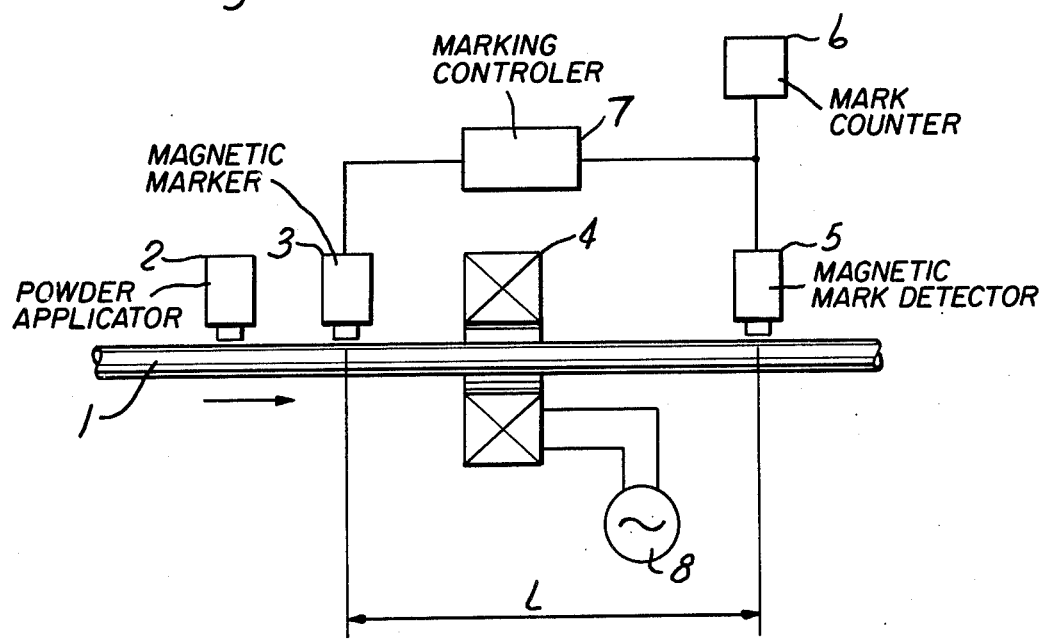

United States Patent [19]

Ito

[11] 3,970,921

[45] July 20, 1976

[54] METHOD AND APPARATUS FOR MEASURING THE LENGTH OF LONG LENGTH MATERIALS

[75] Inventor: Hiroshi Ito, Osaka, Japan

[73] Assignee: Sumitomo Electric Industries, Ltd., Osaka, Japan

[22] Filed: Feb. 14, 1975

[21] Appl. No.: 550,152

[52] U.S. Cl. .............................................. 324/34 L
[51] Int. Cl.² ....................................... G01R 33/12
[58] Field of Search ........................ 324/34 R, 34 L

[56] References Cited
UNITED STATES PATENTS

| | | | |
|---|---|---|---|
| 2,989,690 | 6/1961 | Cook | 324/34 L |
| 3,066,253 | 11/1962 | Bowers | 324/34 L |

OTHER PUBLICATIONS

Panich et al., A Device for Measuring the Length of a Moving Wire, Inst. & Control (G.B.), No. 7, July, 1970, p. 61.

Primary Examiner—Robert J. Corcoran
Attorney, Agent, or Firm—Carothers and Carothers

[57] ABSTRACT

The present invention relates to a method and apparatus for measuring the length of long length materials, whose accuracy in detecting a magnetic mark is improved by having the magnetic mark, used in measuring a long material containing a magnetic constituent unit by passing the periodic magnetic marks through an A.C. magnetic field.

The apparatus for measuring the length of long length materials according to the present invention forms a magnetic powder layer locally on the surface of a long length material containing a magnetic constituent, then applies a magnetic mark, then passes it through an A.C. magnetic field, and detects the magnetic mark at a location at a distance of a known unit length from the location of the application of the magnetic mark and at the same time causes a magnetic mark to be subsequently applied on the preceding magnetic powder layer, this procedure being repeated to measure the length unit length by unit length of the material.

6 Claims, 1 Drawing Figure

METHOD AND APPARATUS FOR MEASURING THE LENGTH OF LONG LENGTH MATERIALS

The present invention provides an apparatus which is simple and easy to handle and which has an improved accuracy for measurement unit length by unit length as a result of having the magnetic marks pass through an A. C. magnetic field to demagnetize the magnetic marks produced on the magnetic constituent of the long length material itself and to thereby also shorten the length of each magnetic mark.

DESCRIPTION OF THE INVENTION

The present invention relates to an apparatus for measuring the length of a long length material which is capable of effecting accurate measurement by reducing measurement errors by shortening the length of the magnetic mark by demagnetizing the magnetization applied on the magnetic constituent of the long length material in measuring the length of a long length material containing a magnetic constituent, particularly such a long length material as steel-reinforced aluminum stranded wire, by applying a magnetic powder to the long length material, then applying thereto a magnetic mark and detecting it by means of a magnetic mark detector.

In case the long length material measured is one that contains a magnetic constituent, for example steel-reinforced aluminum stranded wire, the magnetic mark is applied also to the magnetic constituent of the long length material at the same time as the magnetic mark is applied to the layer of magnetic powder which is applied on the outer surface of the long length material when a magnetic mark is applied to the magnetic powder on the outer surface of the long length material, by a magnetic marking device. This results in a tendency that the length of the magnetic mark becomes long.

On the other hand, the mark detector operates by detecting the maximum value of the magnetic mark, so that it becomes difficult to detect the maximum value of the magnetic mark if the length of the magnetic mark becomes long. This has resulted in a drawback in that the accuracy of the measurement is low.

An object of the present invention is to provide an apparatus for measuring the length of long length materials which is free from the afore-mentioned drawback and which makes it possible to accomplish accurate measurement by reducing measurement errors by shortening the length of the magnetic marks by demagnetizing the magnetization applied to the magnetic constituent of the long length material in measuring the length of a long length material containing a magnetic constituent by applying thereto a magnetic powder, applying thereto a magnetic mark and detecting it by means of a magnetic detector.

Another object of the present invention is to provide a demagnetizing device which demagnetizes magnetic marks produced on the magnetic material which constitutes a part of the long length material, but which does not demagnetize magnetic marks produced on the magnetic powder applied to the surface of the long length material.

The present invention relates to an apparatus for measuring the length of long length materials which has a magnetic powder application device, a magnetic marking device, an A.C. magnetizing coil and a magnetic mark detector arrayed in this order along the line of progress or travel of the long length material. The distance between said magnetic marking device and the magnetic mark detector is made a fixed unit length, and the measurement of the long length material being made by detecting the magnetic mark by means of the magnetic mark detector after the travelling long length material on which magnetic powder has been applied and magnetic mark has been applied by means of the magnetic marking device is passed through an A.C. magnetic field.

The said and other objects characteristics and advantages of the present invention will become apparent from the following description when read in connection with the accompanying drawing.

Some example of the embodiment of the present invention is explained with reference to the accompanying drawing, which should not be construed as restrictive.

FIG. 1 is a schematic diagram showing an example of the apparatus for measuring the length of long length materials according to the present invention.

An example of the apparatus for measuring the length of long length materials according to the present invention will be explained with reference to the drawing.

A magnetic powder application device 2, a magnetic marking device 3, an A.C. magnetizing coil 4 and a magnetic mark detector 5 are placed in this order along the line of progress of a long length material 1 containing a magnetic constituent, such as steel-reinforced aluminum stranded wire.

The distance between said magnetic marking device 3 and the magnetic mark detector 5 is made a fixed unit length L. The A.C. magnetizing coil 4 is connected to an A.C. supply source. A mark counter 6 is connected to the magnetic mark detector 5, and the magnetic marking device 3 is connected thereto via a marking control device 7.

Now we will explain how the apparatus according to the present invention operates.

A molten mixture of magnetic powder and paraffin or a mixture of magnetic powder and a rapid drying solvent is applied by means of the magnetic powder application device 2 to the outer surface of the travelling long length material 1 containing a magnetic constituent to form a magnetic powder layer. The magnetic marking device 3 magnetizes this magnetic powder layer produced on the outer surface of the long length material 1 to produce a magnetic mark.

The long length material 1 which has a magnetic mark applied thereon proceeds in the A.C. magnetic field generated by the A.C. magnetizing coil 4 in the direction of the magnetic field.

When this magnetic mark on the long length material 1 reaches the position of the magnetic mark detector 5 as the long length material travels on, the magnetic mark detector 5 detects the magnetic mark and issues a signal.

This signal, via the marking control device 7, activates the magnetic marking device 3 to apply a magnetic mark again on the magnetic powder layer on the outer surface of the long length material.

At the same time, this signal activates the mark counter 8 to count the mark. If this operation is repeated for $n$ times, the actual length of the long length material is measured as $n \times L$.

In case the long length material 1 is, for example, steel-reinforced aluminum wire, the magnetic force produced on the steel wire is demagnetized when the steel-reinforced aluminum strand wire travels through the A.C. magnetic field generated by the A.C. magnetizing coil 4. On the other hand, the magnetic force produced on the magnetic powder is not demagnetized. This is because the magnetic powder used is the powder of iron oxide and has a property that it is harder to demagnetize than steel.

When magnetizing by the magnetic marking device 3, the magnetic force at the magnetic end nearest to the magnetic marking device 3 is strong because of the distribution of the magnetic field and the magnetization is short in the longitudinal direction of the long length material. However, the magnetization of the steel core contained in the interior of the long length material is longer in the longitudinal direction than the magnetization of the magnetic powder layer. In consequence, if the magnetic force produced on the steel core is demagnetized, the length of the magnetic mark becomes shorter and the detection of the maximum value becomes easier, resulting in a smaller detection error.

The magnetization and demagnetization conditions in the example of embodiment of the present invention are as follows:

| | |
|---|---|
| Size of the magnetic powder grain in the layer composite on the surface of the long length material | approx. 5μ |
| Mixture of magnetic power and paraffin Thickness of the layer composite, | 4 mm |
| Magnetizing force | 4.0 ~ 4.3 Kilogauss |
| Coercive force | 1,700 ~ 2,200 Örsted |
| Intensity of A.C. magnetic field | 1 Kilogauss |
| A.C. magnetic field coil | 10,000 ampere turn |
| A.C. magnetization frequency | 60 Herz |
| Length of magnetization mark (before demagnetization) | 291 mm |
| Length of mark after demagnetization | 6.2 mm |

Upon passage through the A.C. magnetic field, the length of the magnetic mark is reduced to about one-fiftieth.

As mentioned above, the apparatus of the present invention makes it possible to reduce the measurement error and accomplish an accurate measurement by demagnetizing the magnetization of the magnetic constituent of the long length material and thereby shortening the length of the magnetic mark when measuring the length of a long length material containing a magnetic constituent such as steel-reinforced aluminum wire by applying magnetic powder to the surface of the long length material, applying a magnetic mark thereto and detecting it by means of a magnetic mark detector.

We claim:

1. An apparatus for measuring the length of a longitudinally traveling long length material containing a magnetic constituent comprising a magnetic powder application device to apply a magnetic powder layer to the traveling long length material, a magnetic marking device to periodically magnetize said magnetic powder layer and inevitably said magnetic constituent and thereby produce a periodic magnetic mark, an alternating current magnetizing coil positioned to demagnetize the magnetic constituent of said material as it travels through the field of said coil to shorten the length of said mark and thereby more sharply define it, a magnetic mark detector positioned a predetermined length from said magnetic marking device to detect said magnetic marks as they pass by said detector, and counting means to count the detected marks and thereby measure said long length material by counting the number of said predetermined lengths which pass said detector.

2. The apparatus of claim 1 wherein the long length material being measured contains a steel magnetic constituent and said magnetic powder is a powder of iron oxide, said coil being operable to demagnetize the magnetic constituent of the long length material due to magnetic marking thereby shortening said magnetic marks.

3. The apparatus of claim 1 including a marking control device which receives mark detection signals from said detector and correspondingly actuates said marking device to produce one of said magnetic marks.

4. The method of measuring the length of a longitudinally traveling long length material containing magnetic constituents comprising the steps of applying a magnetic powder to the long length material, periodically magnetically marking the applied magnetic powder and inevitably the magnet constituents of said material, demagnetizing the magnetic constituent of said material to shorten said marks and thereby sharply defining them, magnetically detecting said shortened marks at a predetermined length from the point of magnetically marking the long length material, and counting said detections to thereby measure the length of said material by counting the number of said predetermined lengths.

5. The method of claim 4 which also includes the step of periodically conducting said step of marking in response to the periodic detection of said marks.

6. The method of claim 4 wherein the step of demagnetizing the magnetic constituents is accomplished by passing said marks through the field of an alternating current magnet.

* * * * *